Aug. 18, 1953   F. W. MEREDITH   2,649,564
AUTOMATIC CONTROL SYSTEM
Filed Aug. 9, 1948   2 Sheets-Sheet 1
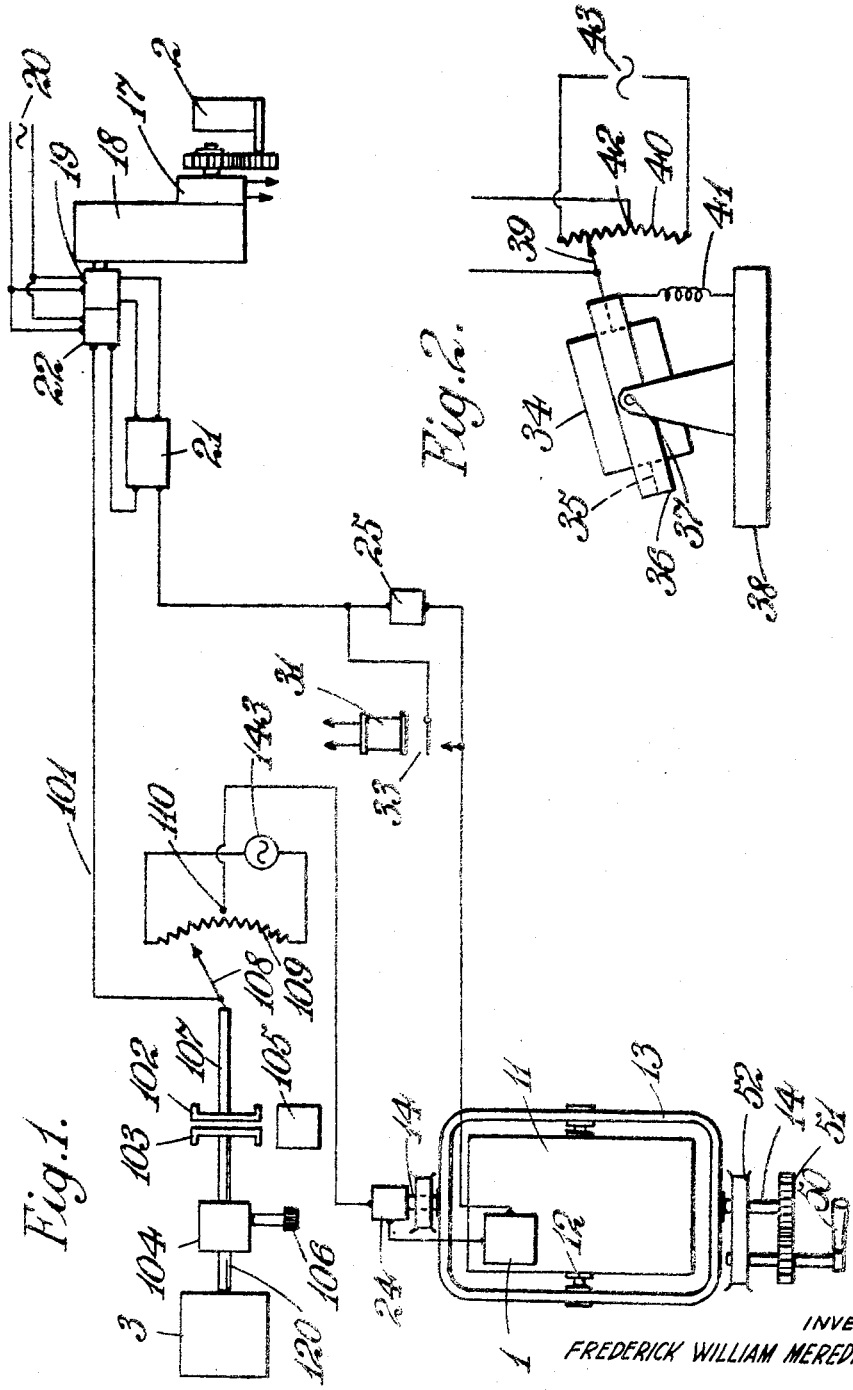
INVENTOR
FREDERICK WILLIAM MEREDITH
BY Moore & Hall
ATTORNEYS Aug. 18, 1953    F. W. MEREDITH    2,649,564
AUTOMATIC CONTROL SYSTEM
Filed Aug. 9, 1948    2 Sheets-Sheet 2
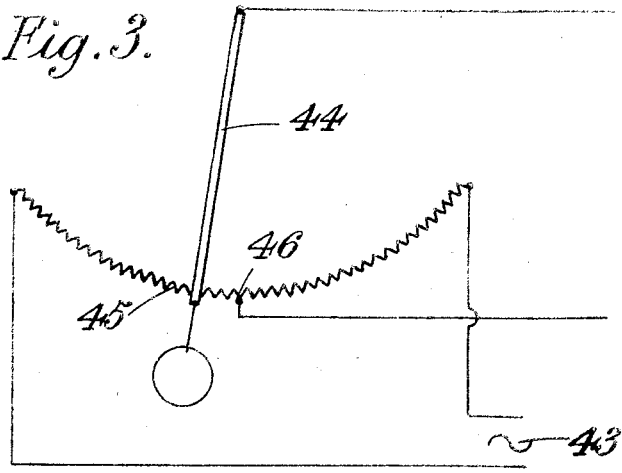
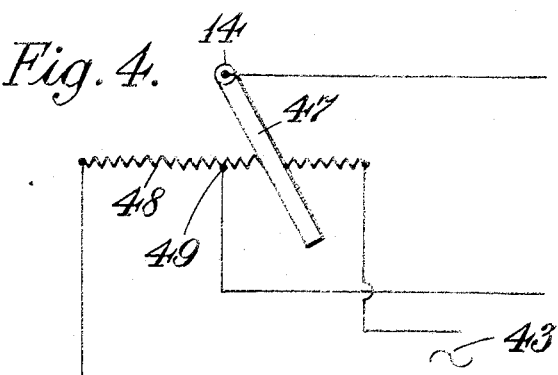
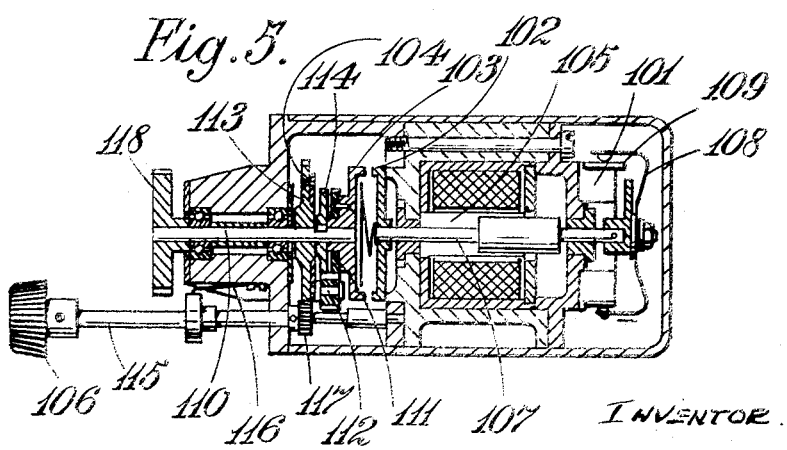
INVENTOR.
FREDERICK WILLIAM MEREDITH.

Patented Aug. 18, 1953

2,649,564

UNITED STATES PATENT OFFICE 2,649,564

AUTOMATIC CONTROL SYSTEM

Frederick William Meredith, London, England, assignor to S. Smith & Sons (England) Limited, London, England, a British company Application August 9, 1948, Serial No. 43,336
In Great Britain August 5, 1947

16 Claims. (Cl. 318—489)

This invention relates to automatic control systems for maintaining a condition at a predetermined value by supplying an appropriate signal to a servo system controlling the condition. It is usual in such control systems to provide a detector for detecting deviation of the condition from the predetermined value and a generator for generating the signal proportional to the deviation. This signal is applied to the servo system and causes a servomotor to operate so as to restore the condition to the predetermined value. Control systems of this type will be referred to in this specification and accompanying claims as "an automatic control system of the type described."

Other control signals, such as signals proportional to the rate of deviation, servomotor displacement and servomotor speed, may also be applied to the servomotor, but the algebraic sum of all the signals applied to the servomotor should be zero when the condition is steady and at a predetermined value. Circumstances may however arise in which this sum is not zero. For instance, there may be a torque demand on the motor or one of the signal generators may have a zero error. Furthermore, it may only be possible to provide the signal necessary to meet the torque demand or to balance the false signal from the generator having a zero error by a signal from the generator operated by the deviation detector and this can only be achieved by the steady state condition differing from the predetermined value. The present invention is directed towards overcoming this difficulty.

According to the present invention, an automatic control system of the type described comprises means for giving the deviation detector or the generator controlled thereby a zero error to compensate for any zero error in the system so that the condition is stabilised at the required predetermined value.

The invention also consists in an automatic control system of the type described, which system comprises a deviation detector giving a mechanical indication of the deviation of the condition from a predetermined value, a signal generator mechanically coupled to said detector and means for displacing the part of the coupling connected to the generator relative to the part connected to the detector, whereby, if any zero error exists in the system so that the condition is stabilised at a value other than the predetermined value, displacement between the two parts of the coupling may be effected until the condition is stabilised at the predetermined value.

Thus the detector and generator may be coupled together through a clutch whereby, if any zero exists in the system so that the condition is stabilised at a value other than the predetermined value, the generator may be declutched from the detector and reclutched with the condition at the predetermined value and the generator emitting a signal compensating for said zero error. Means should also be provided for ensuring that the signal from the generator does not vary during such time as the clutch is disengaged. As an alternative to or in addition to the clutch, the detector and generator may be coupled together through a differential gear which provides means for varying the relative positions of detector and generator.

Where the control system is electrical, the generator preferably comprises an electrical potentiometer the moving part thereof being coupled to the detector.

The automatic control system of the invention may be applied to an aircraft in order to stabilise the aircraft in a predetermined attitude. In this case the detector is preferably a gyroscope arranged to give a mechanical indication of the deviation of the aircraft from its predetermined attitude about one of the control axes of the aircraft. If the axis concerned is the yaw axis, the gyroscope may conveniently be of the type monitored to maintain a fixed orientation with respect to the horizontal component of the earth's magnetic field, as disclosed for instance in British patent specification No. 586,506.

The nature of this invention and the manner in which it is to be performed will be more clearly understood from the following description of an aircraft automatic pilot, reference being made to the accompanying drawings which illustrate a modification in the system described in patent application Serial No. 655,634, now Patent No. 2,607,550 and in which:

Figure 1 illustrates the system for controlling an aircraft about the yaw axes,

Figure 2 shows in further detail the rate of turn instrument shown in Figure 1,

Figure 3 illustrates in further detail the sideslip detector shown in Figure 1,

Figure 4 illustrates in further detail the tangent potentiometer shown in Figure 1, Figure 5 illustrates in further detail the differential gear and the clutch shown in Figure 1.

As shown in Figure 1, the aircraft is stabilised about the yaw axis by means of a rate of yaw gyroscope 1, mounted on a platform 11 gimballed about the pitch axis 12 in a gimbal ring 13 pivoted in the aircraft about the roll axis 14. The gimbal ring 13 can be rotated relative to the aircraft about the roll axis 14 by means of a handle 50 through gearing 51, the support 52 for the roll axis 14 being secured to the aircraft. During straight flight conditions, the platform is centrally positioned about the roll axis.

The rudder 2 is coupled through a clutch 17 and gear box 18 to an electric hysteresis motor 19 of the kind described in Britain patent specification Nos. 576,248 and 576,249. Motor 19 is wound for two-phase operation, one phase (a reference phase) being coupled to an A. C. source 20, and the other phase the control phase, being coupled to the output of an amplifier 21. Motor 19 is coupled to a hysteresis generator 22 of the kind described in British patent specification No. 576,351. The generator is also wound for two-phase operation, one phase being connected to the source 20 so that an output proportional to the speed of the generator and therefore of the motor is generated in the other phase, the phase of the generator output being substantially in quadrature with that of source 20.

In order to bank the aircraft, the gimbal ring 13 is rotated about axis 14 by handle 16 and relay 31 is energised. By a servo system, which is not illustrated and which forms no part of the present invention, the ailerons are operated to bank the aircraft so as to maintain the platform level in space i. e. the aircraft is banked through an angle equal and opposite to that through which the gimbal-ring 13 is rotated.

Before considering the operation of the rudder control circuit it is necessary to say a word about the components in the circuit. The rate gyroscope 1 will be described in greater detail hereinafter, and it will suffice for an understanding of Figure 1 to state that a voltage is produced across its output terminals which is proportional to the rate of turn and is of the same frequency as that of the source 20 but is in quadrature therewith lagging or leading according as the turn is in one direction or the other. Tangent potentiometer 24 is mounted on the axis 14. This instrument will be described in greater detail hereinafter and it will suffice for an understanding of Figure 1 to state that a voltage appears across the output terminals of the potentiometer 24 which is proportional to the tangent of the angle through which the platform 11 is turned in roll from its normal central position by the handle 50 and is of the same frequency as that of the source 20 but in quadrature therewith lagging or leading according as the turn is in one direction or the other. A pendulum 25 which will be described with reference to Figure 3 is provided to detect side slip.

In addition to these components there is an instrument for giving an A. C. signal in accordance with the deviation of the craft in azimuth from a preset course. This instrument comprises a directional gyroscope 3 coupled through a differential gear 104 to a driving clutch member 103. The corresponding driven clutch member 102 drives through shaft 107 the wiper arm 108 of a potentiometer 101 having an arcuate resistance 109. A source 143 having an A. C. output of the same frequency as that of source 20 and in quadrature therewith is connected across potentiometer resistance 109 and an output is taken between the mid-point 110 of resistance 109 and the slider arm 108. It will be appreciated that the output will be an A. C. signal proportional to the displacement of the arm 108 from centre point 110 and of the same frequency as source 20 but in quadrature therewith lagging or leading thereon as the displacement is in one direction or the other. Engagement of the clutch members 102, 103 is effected by a solenoid 105. Solenoid 105 is de-energised to disengage the clutch when the gimbal ring 13 is rotated in roll and whenever the aircraft is being flown under manual control. When the clutch members 102, 103 are engaged the shaft 107 may be rotated relative to the directional gyroscope by rotation of the control knob 106 associated with the differential gear 104.

The side slip pendulum may be short circuited by closing the pair of contacts 33. The relay 31 controls these contacts so that when the gimbal ring 13 is rotated about the roll axis from the horizontal the contacts 33 are open. During straight flight the contacts are closed.

Considering the circuit during level flight of the aircraft the output from the rate of yaw gyroscope 1 is applied in series with the outputs from potentiometer 101 and feed-back generator 22 to the input of amplifier 21. On commencing the level flight the directional gyroscope 3 is clutched to the potentiometer arm 108 so that when the aircraft is flying on a predetermined course the arm 108 is coincident with the centre point 110 of potentiometer resistance 109 and hence no signal is emitted from potentiometer. The sum of three voltages is thus applied to the input of the amplifier 21. These voltages are proportional respectively to the rate of yaw as measured by rate of yaw gyroscope 1, the deviation from the preset course as measured by gyroscope 3 and potentiometer 101 and the speed of the motor 19. Potentiometer 101 acts purely as a monitor, that is, it gives a comparatively weak signal compared with those derived from rate of yaw gyroscope 1 and generator 22 and its effect on the operation of the motor 19 during a disturbance may be neglected. The motor 19 operates to reduce the input to the amplifier and since the gain of the amplifier is made very large it will reduce this input substantially to zero that is to say during a disturbance the motor will run at such a speed that the output of the generator 22 is substantially equal but opposite to the output of the rate of yaw device 1, or in other words the motor 19 and therefore the rudder 2 will be operated at a speed proportional to the rate of yaw. This will have the effect of very rapidly stablising any disturbance in yaw. If after a disturbance has been stabilised the aircraft is flying off course, the wiper arm 108 will be displaced from centre point 110 and a signal will be applied to yaw amplifier 21 which will cause the craft to return to the desired course.

Normally when the aircraft is stabilised on course there are no signals from the rate of yaw gyroscope 1, potentiometer 101, or yaw generator 22. It may be however, that the gyroscope 1 or the generator 22 has a zero error so causing signals to be generated when the aircraft is not turning or when the generator 22 is not turning. Also, out of trim conditions may result in a torque demand on the rudder motor 19 to hold the craft on course, which will necessitate a non-zero input to the amplifier when the craft is on course, and the amplifier itself may have a zero error, i. e. zero input may not correspond to zero output. In such circumstances it becomes necessary for the potentiometer 101 to generate a signal either to balance the false signal from the rate of turn gyroscope 1 or generator 22, to supply the torque demand or to compensate for the amplifier zero error. This the potentiometer 101 can do if the aircraft turns on to a different course. Consequently the aircraft under these conditions would be stabilised off course as zero signal from the potentiometer would not correspond to the desired course of the craft.

If it is found that the aircraft is flying off course for any of the above reasons, two courses of action are open to the pilot. He may disengage the automatic control system and bring the aircraft on to the appropriate course by manual control. Since potentiometer 101 is provided with no centering spring the clutch member 102 will remain in the position at which it was left before disengagement was effected, i. e. at that position in which the signal from the potentiometer 101 cancels out the zero errors or supplies a sufficient signal to amplifier 21 to enable motor 19 to generate the torque necessitated by an out of trim condition. However, as the aircraft is turned in azimuth by manual control the clutch member 103 will rotate relative to clutch member 102. When the aircraft is brought on to the corrected course the clutch members 102, 103 are engaged. The aircraft will then fly on the corrected course with the slider arm 108 displaced from centre point 110 by a sufficient extent to cancel zero error in the system or to cause motor 19 to exert the necessary torque to counteract the out of trim condition.

The pilot may also bring the aircraft on the correct course by rotating control knob 106. Rotation of this knob produces rotation of the clutch members 102, 103 and hence of slider 108 relative to the directional gyroscope (which maintains its orientation in space substantially constant). Thus by the rotation of the knob in the appropriate direction and by an appropriate amount the aircraft can be made to fly on the desired course the slider arm 108 being displaced from centre-point 110 by a sufficient amount to provide the required signal as before.

Change of course is effected by bank turns. To achieve this the gimbal ring 13 is rotated by handle 50 to bank the aircraft as previously described. When the gimbal ring 13 is rotated in roll, relay 31 and solenoid 105 are actuated to disengage clutch members 102, 103 and to open contacts 33. When the gimbal ring 13 has been rotated through the required angle of bank the tangent potentiometer 24 will emit an A. C. signal proportionate to the tangent of this bank. This signal is applied in series with those from rate of yaw gyroscope 1 and side slip detector 25 to the input of amplifier 21 there being no signal from potentiometer 101. The rudder servo system will operate until the signals from the rate of roll gyroscope 1 and tangent potentiometer 24 are equal and opposite, i. e. the aircraft will turn in azimuth at a rate appropriate to the setting of the tangent potentiometer. As is well known, for a correctly banked turn the rate of turn in azimuth is directly proportional to the tangent of the angle of bank and inversely proportional to the air speed. The constant of proportionality of the tangent potentiometer 24 is set to give a signal equal to or opposite to that given by the rate of turn instrument 1 when the aircraft is turning at the correct rate of travel at the cruising speed. If the aircraft is not travelling at its cruising speed, side slip will take place and the side slip detector 25 will give a signal causing the rate of turn in azimuth to be varied so as to counteract the side-slip.

When the aircraft has turned on to the new course, the gimbal ring 13 is returned to its original position and the relay 31 is de-energised and solenoid 105 re-energised. The bank is thus taken off and further turning stopped. During the turn the clutch member 103 rotates relative to clutch member 102 so that at the end of the turn when the clutch is re-engaged, the directional gyroscope 3 and potentiometer 101 will monitor the aircraft on the new course. In addition, if before the turn the conditions existed in which a signal from the potentiometer 101 was required in order to maintain the aircraft on a correct course, when the clutch is re-engaged and the aircraft is flying on its new course the signal from the potentiometer 101 will again be that required to compensate for any zero error in the system.

In patent application Serial No. 655,684 a suitable system for control of the aircraft about the pitch and roll axes is described.

A suitable rate of turn gyroscopes for use as gyroscope 1, is illustrated diagrammatically in Figure 2. As there shown a gyroscope comprises a rotor 34 mounted on spin axis 35 in a gimbal ring 36 gimballed about an axis 37 on a fixed base 38. Carried by the gimbal ring 36 is a potentiometer contact 39 arranged to sweep across a fixed arcuate potentiometer resistance 40 as the ring rotates relatively to the base about the axis 37. The ring 36 is restrained by a spring 41 to a central position in which the contact 39 engages the mid point 42 of the resistance 40. The resistance 40 is connected across the A. C. source 43. The electrical output of the gyroscope appears between the contact 39 and the mid point 42.

In operation any turn about an axis normal to the base 38 results in precession of the gyroscope about the axis 37 against the spring restraint to an extent determined by the rate of turn. Hence the output voltage will be proportional to the rate of turn.

As an alternative to the use of gyroscopes in the arrangement described with reference to Figure 1, the rate of turn devices described in patent application Serial No. 504,072 may be used.

A pendulum suitable for use as side-slip detector 25 is illustrated diagrammatically in Figure 3. As there shown a pendulum 44 of suitable conducting material is pivoted to swing about an axis parallel to the roll axis. The pendulum 44 sweeps across an arcuate resistance 45 connected to the A. C. source 43, so that the electrical output appears between the pendulum 44 and the mid point 46 of the resistance 45.

The tangent potentiometer 24 is illustrated diagrammatically in Figure 4. As there shown, an arm 47 of conducting material is attached to the axis 14 so as to rotate with the gimbal ring 13 and sweeps over a linear resistance 48 connected across the A. C. source 43. The output appearing between the arm 47 and the mid point 49 of the resistance is thus proportional to the tanget of the angle through which the gimbal ring 13 is turned.

Figure 5 illustrates the differential gear 104, clutch members 102, 103 and potentiometer 101 in more detail. The slider arm 108 of potentiometer 101 is secured to shaft 107 which at its other end is secured to clutch member 102, and clutch member 103 shown as disengaged from clutch member 102 can be rotated easily about shaft 120 which is coaxial with shaft 107. Clutch member 103 has attached to it the gear wheel 111 engaging with planet wheel 112 mounted on a gear wheel 113 which can rotate freely about shaft 120. Shaft 120 is driven by the directional gyroscope 3 through gear-wheel 118. Gear wheel 114 located between gear wheel 113 and clutch member 103 is keyed to shaft 120 and also engages with planet wheel 112. Gear wheels 111 and 114 are of equal diameter but wheel 111 has one more tooth than wheel 114. Control knob 106 is attached to a further shaft 115. Accidental rotation of shaft 115 is prevented by the friction action of spring 116. Gear wheel 117 on shaft 115 engages with gear wheel 113. The solenoid controlling the clutch member 102 is illustrated at 105.

Rotation of shaft 120 is transferred to shaft 107 through gear wheel 114, planet wheel 112 gear wheel 111 and clutch members 102, 103, the position of planet wheel 112 being normally fixed. When the clutch members 102, 103 are engaged and control knob 106 is rotated, gear wheel 113 is rotated causing planet wheel 112 to turn about shaft 110 and hence turn gear wheel 111, gear wheel 114 being held stationary by the directional gyroscope. It will be seen that the gear-ratio between shafts 115 and 107 is very low, so that a fine adjustment of the potentiometer slider with respect to the directional gyroscope by rotation of knot 106 is obtainable.

I claim:

1. An automatic control system for maintaining a condition at a predetermined value comprising a detector giving a mechanical indication of the deviation of the condition from the predetermined value, a signal generator mechanically coupled to said detector through a clutch and giving a signal in accordance with said deviation, a servo system controlling the condition and controlled by said signal, means for effecting engagement and disengagement of the clutch, means for ensuring that the signal from the generator does not vary upon disengagement of said clutch and during such time as the clutch is disengaged and means for causing relative movement of the engaging members of said clutch when disengaged, whereby, if any zero error exists in the system so that the condition is stabilised at a value other than the predetermined value, the generator may be declutched from the detector and reclutched with the condition at the predetermined value and the generator emitting a signal compensating for said zero error.

2. An automatic control system for maintaining a condition at a predetermined value comprising a detector giving a mechanical indication of the deviation of the condition from a predetermined value, a signal generator giving a signal in accordance with said deviation mechanically coupled through a clutch and a differential gear which provides means for varying the relative positions of the detector and the generator, means for effecting engagement and disengagement of the engaging members of said clutch, means for ensuring that the signal from the generator does not vary upon disengagement of said clutch and during such time as the clutch is disengaged, means for causing relative movement of said members when disengaged and a servo system controlling the condition and controlled by said signal whereby, if any zero error exists in the system so that the condition is stabilised at a value other than the predetermined value, the relative positions of the generator and detector may be varied so that the generator emits a signal compensating for said zero error with the condition at the predetermined value.

3. An automatic control system for maintaining a condition at a predetermined value comprising a detector giving a mechanical indication of the deviation of the condition from a predetermined value, an electrical potentiometer the moving part thereof being mechanically coupled through a clutch to said detector, giving an electric signal in accordance with said deviation, an electric servo system controlling the condition and controlled by said signal, means for effecting engagement and disengagement of the clutch means for ensuring that the signal does not vary upon disengagement of said clutch and during such time as said clutch is disengaged, and means for causing relative movement of the engaging members of said clutch when disengaged whereby if any zero error exists in the system so that the condition is stabilised at a value other than the predetermined value, the potentiometer may be declutched from the detector and reclutched with the condition at the predetermined value and the potentiometer emitting a signal compensating for said zero error.

4. An automatic control system as claimed in claim 2 in which the servo system is electrical and the said generator comprises an electrical potentiometer, the moving part thereof being coupled through said clutch and differential gear to said detector.

5. An automatic control system for maintaining an aircraft in a predetermined attitude about one of the axes of the aircraft comprising a detector for detecting deviation of the aircraft about said axis, said detector giving a mechanical indication of said deviation, a signal generator generating a signal in accordance with the displacement from a datum position of a moving part thereof couping means to couple said detector and said moving part, a servomotor system controlled by said signal and controlling the appropriate control surface of the aircraft, means for effecting engagement and disengagement of the engaging members of said coupling means, means for ensuring that the signal does not vary upon disengagement of said clutch and during such time as said clutch is disengaged and means for causing relative movement of said members when disengaged whereby, if any zero error exists in the system so that the aircraft is stabilised at an attitude other than the predetermined attitude, the generator may be declutched from the detector and reclutched with the aircraft in the predetermined attitude and the generator emitting a signal compensating for said zero error.

6. An automatic control system as claimed in claim 5 in which said generator is an electrical potentiometer and said motor control system is electrical.

7. An automatic control system as claimed in claim 6 in which the generator and detector are also coupled through a differential gear providing means for varying relatively the positions of the generator and detector when the clutch is engaged.

8. An automatic control system as claimed in claim 7 in which the coupling means is disengaged when the aircraft is flown under manual control.

9. An automatic control system as claimed in claim 8 wherein the coupling means comprises electromagnetic means for coupling and decoupling said detector.

10. An automatic control system as claimed in claim 9 in which the detector is a gyroscope.

11. An automatic control system for maintaining a condition at a predetermined value comprising a detector giving a mechanical indication of the deviation of the condition from the predetermined value, a signal generator mechanically coupled to said detector through a clutch and giving a signal in accordance with said deviation, means for ensuring that the signal from the generator does not vary upon disengagement of said clutch and during such time as said clutch is disengaged, whereby if any zero error exists in the system so that the condition is stabilised at a value other than the predetermined value the generator may be declutched from the detector and reclutched with the condition at the predetermined value and the generator emitting a signal compensating for said zero error.

12. In combination in an automatic control system for maintaining a condition at a desired value, a directional gyro arranged to detect deviations of said condition from said value, a potentiometer having a movable arm, drive means having a clutch connecting said arm and said gyro and connected to move said arm in response to said gyro, said arm being constructed to remain stationary during disengagement of said clutch means and indicate zero error in the system upon return of said condition to said value whereby said condition can be stabilized at a value representing the algebraic sum of said desired value and any zero error.

13. In combination in an automatic control system for maintaining a condition at a desired value, means to control said condition, detecting means to detect departure of said condition from said value, signal means connected to said control means, and connecting means for connecting and disconnecting said detecting means and said signal means and serving to maintain the signal therefrom constant for a limited time while disconnected at the zero error value of the system, said connecting means and said signal means serving to compensate for any zero error in the system by reconnection after disconnection whereby said signal means continually produces said maintained signal containing said zero error and introduces it into the system by said reconnection.

14. An automatic pilot control system for maintaining a craft on a desired course, in combination, a movable craft, force exerting means on said craft to control said craft with respect to said course, detecting means to detect departure of said craft from said course, rate of turn sensitive means mounted on said craft, sideslip indicating means mounted on said craft, operating means for said force exerting means, signal means connected to said departure detecting means, said operating means connected to each said signal means, said rate of turn sensitive means and said side-slip indicating means and integrating the signals therefrom and variable connecting means for connecting and disconnecting said signal means and said departure detecting means and serving to cause said signal means to signal to said operating means detected departures of said craft from said course and any zero error in the system whereby said craft can be stabilized on a selected course and any zero error compensated by connecting, disconnecting and reconnecting said connecting means.

15. The combination set forth in claim 14, said variable connecting means having two positions, for one said position said signal means produces a signal determined by said departure detecting means, for the other said position said signal means produces a constant signal equal to a previous value determined by said departure detecting means.

16. In combination in an automatic pilot control system for maintaining a movable craft on a desired course, a movable craft, means to control said craft with respect to said course, detecting means to detect departure of said craft from said course, signal means connected to said control means and two-position variable connecting means joining said detecting means and said signal means, in one position of said connecting means said signal means producing a signal determined by said detecting means and in another position of said connecting means said signal means producing a constant signal equal to the last previous value detected by said detecting means, said signal means thus being caused to signal to said control means detected departures from said course and any zero error in the system whereby said craft can be stabilized on a selected course and any zero error compensated.

FREDERICK WILLIAM MEREDITH.

References Cited in the file of this patent

UNITED STATES PATENTS

| Number | Name | Date |
|---|---|---|
| 1,581,147 | Whitaker | Apr. 20, 1926 |
| 1,998,939 | Mittag | Apr. 23, 1935 |
| 2,361,790 | Noxon | Oct. 31, 1944 |
| 2,415,429 | Kellogg et al. | Feb. 11, 1947 |
| 2,451,263 | Webb | Oct. 12, 1948 |
| 2,464,629 | Young | Mar. 15, 1949 |